(12) United States Patent
Lu et al.

(10) Patent No.: US 10,880,102 B2
(45) Date of Patent: Dec. 29, 2020

(54) METHOD AND APPARATUS FOR LOGIC CELL-BASED PUF GENERATORS

(71) Applicant: Taiwan Semiconductor Manufacturing Co., Ltd., Hsin-Chu (TW)

(72) Inventors: Shih-Lien Linus Lu, Hsinchu (TW); Cormac Michael O'Connell, Kanata (CA)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 198 days.

(21) Appl. No.: 16/138,690

(22) Filed: Sep. 21, 2018

(65) Prior Publication Data

US 2020/0099540 A1 Mar. 26, 2020

(51) Int. Cl.
*H04L 9/32* (2006.01)
(52) U.S. Cl.
CPC .......... *H04L 9/3278* (2013.01); *H04L 9/3247* (2013.01); *H04L 2209/12* (2013.01)
(58) Field of Classification Search
CPC ... H04L 9/0866; H04L 9/3278; H04L 9/0861; H04L 2209/12; G11C 7/06; G11C 11/4091; G11C 7/24
See application file for complete search history.

(56) References Cited

PUBLICATIONS

Lu, S.L., "Implementation of Iterative Networks with CMOS Differential Logic", IEEE Journal of Solid-State Circuits, Aug. 1988, 23(4)1013-1017.

*Primary Examiner* — Paul E Callahan
(74) *Attorney, Agent, or Firm* — Duane Morris LLP

(57) ABSTRACT

Disclosed is a physical unclonable function generator circuit and testing method. In one embodiment, a physical unclonable function (PUF) generator includes: a PUF cell array comprising a plurality of bit cells configured in a plurality of columns and at least one row, wherein each of the plurality of columns is coupled to at least two pre-discharge transistors, and each of the plurality of bit cells comprises at least one enable transistor, at least two access transistors, and at least two storage nodes, and a PUF control circuit coupled to the PUF cell array, wherein the PUF control circuit is configured to access the plurality of bit cells to pre-charge the at least two storage nodes with substantially the same voltages allowing each of the plurality of bit cell having a first metastable logical state; to determine a second logical state; and based on the determined second logical states of the plurality of bit cells, to generate a PUF signature.

22 Claims, 10 Drawing Sheets

METHOD AND APPARATUS FOR LOGIC CELL-BASED PUF GENERATORS

CROSS-REFERENCE TO RELATED APPLICATION

The present application claims priority to U.S. Provisional Patent Application No. 62/642,921, filed on Mar. 14, 2018, which is incorporated by reference herein in its entirety.

BACKGROUND

A physically unclonable function (PUF) generator is a physical structure generally within an integrated circuit that provides a number of corresponding outputs (e.g., responses) in response to inputs (e.g., challenges/requests) to the PUF generator. A unique identity of the integrated circuit may be established by such challenge-response pairs provided by the PUF generator. With the establishment of the identity, secure communication can be guaranteed. The PUF generator can also be used for existing authentication purposes to replace the current method of assigning an identity to an electronic device. Since the PUF generator is based on intrinsic properties of a manufacturing process, the PUF has various advantages over conventional authentication approaches that inscribes an identity on a device which may be mimicked and/or reverse engineered more easily.

A SRAM (static random-access memory) requires extra distance to isolate SRAM arrays from other logic transistors. Due to this layout design rules, a SRAM-based PUF generator is inefficient. There exists a need for small PUF generators. The proposed PUF design is based on logic transistors. Specifically, a PUF cell based on logic circuit transistor rules instead of SRAM layout rules is presented in this disclosure.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of illustration.

DETAILED DESCRIPTION OF EXEMPLARY EMBODIMENTS

The following disclosure describes various exemplary embodiments for implementing different features of the subject matter. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or one or more intervening elements may be present.

It is understood that even though each of the bit cells in a PUF cell array and even each of the devices within the same bit cell are manufactured using the same process, one or more manufacturing variabilities may still cause each bit cell of the PUF cell array to be unique due to an intrinsic tendency of the bit cell while the bit cell is accessed. For example, each bit cell may have an intrinsic tendency to present either a logic "1" or a logic "0", and moreover, some bit cells may have a strong intrinsic tendency (known as "stable" bit cells) and some bit cells may have a weak intrinsic tendency (known as "unstable" bit cells). A SRAM (static random-access memory) requires extra distance to isolate SRAM arrays from other logic transistors. Due to this layout design rules, a SRAM-based PUF generator is inefficient. There exists a need for small PUF generators. The proposed PUF design is based on logic transistors. Specifically, a PUF cell based on logic circuit transistor rules instead of SRAM layout rules is presented in this disclosure.

Figure 1:
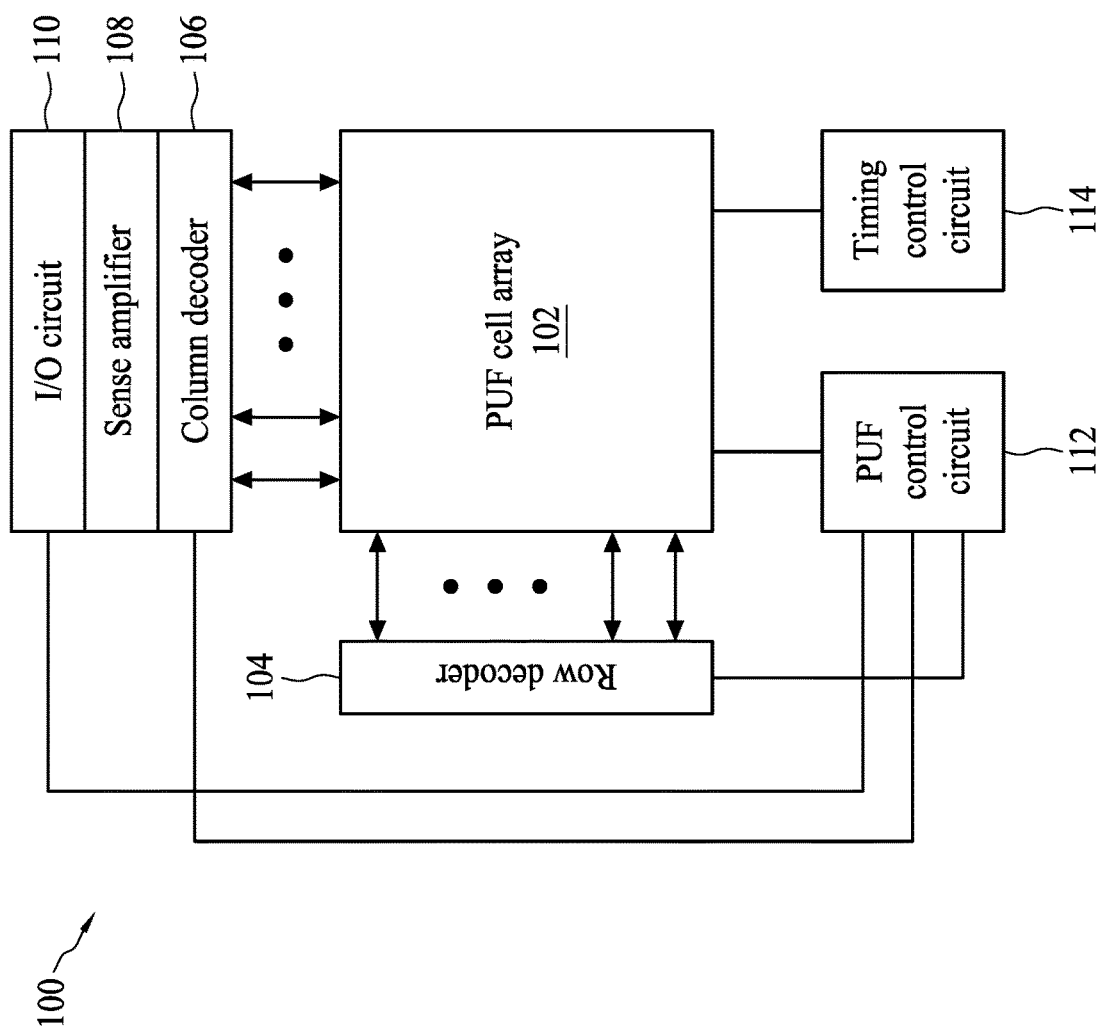
FIG. 1 illustrates an exemplary block diagram of a PUF generator, in accordance with some embodiments of present disclosure.

FIG. 1 illustrates an exemplary block diagram of a PUF generator 100, in accordance with some embodiments of present disclosure. It is noted that the PUF generator 100 is merely an example, and is not intended to limit the present disclosure. Accordingly, it is understood that additional functional blocks may be provided in or coupled to the PUF generator 100 of FIG. 1, and that some other functional blocks may only be briefly described herein.

In the illustrated embodiment of FIG. 1, the PUF generator 100 comprises a PUF cell array 102, a row decoder 104, and a column decoder 106. The row decoder 104 and column decoder 106 are coupled to a plurality of bit cells in the PUF cell array 102. The PUF generator 100 further comprises a sense amplifier 108, an input/output (I/O) circuit 110, a PUF control circuit 112 and a timing control circuit 114, in the illustrated embodiment. All the components may be coupled to each other and further to the PUF control circuit 112 and timing control circuit 114. The PUF control circuit 112 is configured to receive a request/challenge through the I/O circuit 110 (e.g., a request to power on the coupled PUF cell array 102, a request to access the PUF signature of the PUF cell array 102, etc.). In some embodiments, the PUF control circuit 112 is configured to transmit a response based on the logical states of the bit cells of the PUF cell array 102 through the I/O circuit 110 (e.g., a PUF output) in response to the request. In some embodiments, such I/O circuit 110 may be directly coupled to the PUF control circuit 112. The PUF control circuit 112 is configured to control (e.g., increase or decrease) a voltage level of a supply voltage applied at each of the bit cells, control (e.g., increase or decrease) a voltage level applied at each WL coupled to the row decoder 104, as discussed in further detail below. In some embodiments, the PUF control circuit 112 may enable the voltage supply to at least one selected column and at least one selected row. Further, the PUF control circuit 114 may switch between the evaluation mode and the normal operation mode. In some alternative embodiments, the PUF control circuit 112 may be implemented as a separate block, which is not embedded in the PUF cell array 102. In some embodiments, the PUF control circuit 112 can be embedded in the PUF cell array 102. In some embodiments, the timing control circuit 114 provide control and synchronization on pulse signals during read and write processes. In some embodiments, the PUF control circuit 112 and timing control circuit 114 may be coupled to a common data bus for inter-communication.

The PUF cell array 102 includes a plurality of bit cells that are arranged in a column-row configuration in which each column has a bit line (BL) and a bit line bar (BLB), and each row has a word line (WL). More specifically, the BL and BLB of each column are respectively coupled to a plurality of bit cells that are disposed in that column, and each memory cell in that column is arranged on a different row and coupled to a respective (different) WL and a respective (different) WLB. That is, each bit cell of the PUF cell array 102 is coupled to a BL of a column of the PUF cell array 102, a BLB of the column of the PUF cell array 102, and a WL of a row of the PUF cell array 102. In some embodiments, the BL's and BLB's are arranged in parallel vertically and the WL's are arranged in parallel horizontally (i.e., perpendicular to the BL's and BLB's). In some embodiments, the WL for each row of bit cells in the PUF cell array 102 are connected together. In some embodiments, as discussed in further detail below with respect to FIGS. 2 and 4, the PUF cell array 102 can further include a PUF output, and a PUF output bar for each row of bit cells. In some other embodiments, the PUF cell array 102 can further include an enable line (EN) and a pre-discharge line (PD). An illustrated embodiment of the PUF cell array 102 will be provided in further detail below with reference to FIG. 2.

In one illustrated embodiment, each of the bit cells of the PUF cell array 102 comprises a 12-transistors (e.g., 12T-SRAM) bit cell, which will be described in further detail below with reference to FIG. 3. In some embodiments, the PUF cell array 102 comprises a 11-T-SRAM bit cell. In certain embodiments, each of the bit cells of the PUF cell array 102 comprises a 7-transistor (7T-SRAM) bit cell, which will be described in further detail below with reference to FIG. 6.

The row decoder 104 is configured to receive a row address of the PUF cell array 102 from the PUF control circuit 112 and apply a WL at that row address. In some embodiments, the column decoder 106 may be optional. The column decoder 106 is configured to receive a column address of the PUF cell array 102 from the PUF control circuit 112 and apply a BL and/or BLB at that column address. The I/O circuit 110 are configured to access a logical state (i.e., a logical "1" or a logical "0") at each of the bit cells in the PUF cell array 102. In some embodiments, a logical state of a bit cell may be written to or read from a bit cell by the I/O circuit 110. As described above, in some embodiments, the PUF control circuit 112 is coupled to all the components and configured to control the coupled components. In some embodiments, the PUF generator in this present disclosure does not require a sense amplifier 108. The cross-coupled inverters allow "self-sensing" and eliminates the use of a sense amplifier, which advantageously simplify the PUF generator design and can also reduce the cost of PUF generators. This is discussed in further detail in FIGS. 3-8 below.

Figure 2:
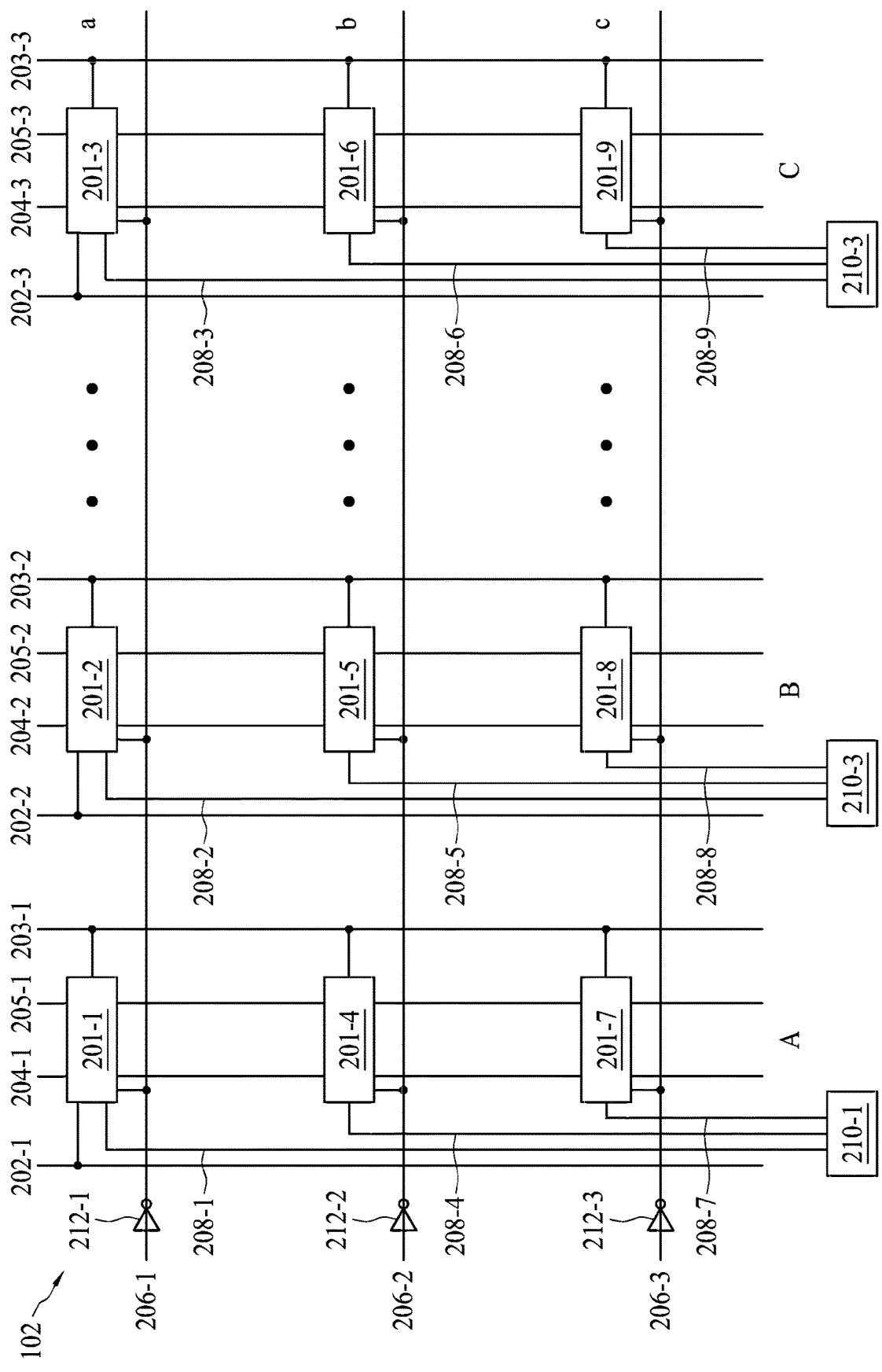
FIG. 2 illustrates an exemplary circuit diagram of a PUF cell array comprising a plurality of bit cells, in accordance with some embodiments of present disclosure.

FIG. 2 illustrates an exemplary circuit diagram of a PUF cell array 102 comprising a plurality of bit cells, in accordance with some embodiments of present disclosure. In some embodiments, the PUF cell array 102 includes a plurality of bit cells 201-1, 201-2, 201-3, 201-4, 201-5, 201-6, 201-7, 201-8, and up to 201-9. Although only 9 bit cells are shown, any desired number of bit cells may be included in the PUF cell array 102 while remaining within the scope of the present disclosure. As described above, the bit cells 201-1, 201-2, 201-3, 201-4, 201-5, 201-6, 201-7, 201-8, and 201-9 are arranged in a column-row configuration. More specifically, in some embodiments, the PUF cell array 102 includes bit lines (BL's) 202-1, 202-2, and 202-3 arranged in parallel, bit line bars (BLB's) 203-1, 203-2, and 203-3 also arranged in parallel, and word lines (WL's) 206-1, 206-2, and 206-3. The WL's 206 are arranged in parallel orthogonally to the BL's 202 and BLB's 203. In some embodiments, the PUF cell array 102 also includes power supply voltage ($V_{DD}$) 204-1, 204-2, and 204-3, and zero reference voltage (GND) 205-1, 205-2 and 205-3. As such, the PUF cell array 102 may include a first plurality of columns (e.g., arranged vertically), a second plurality of rows (e.g., arranged horizontally), wherein each column includes a respective pair of BL 202, BLB 203, $V_{DD}$ 204, GND 205, and each row includes a respective WL 206. In the illustrated embodiments, the 9 bit cells 201 in the PUF cell array 102 may also provide corresponding PUF outputs 208-1, 208-2, 208-3, 208-4, 208-5, 208-6, 208-7, 208-8, and 208-9, which are directly coupled to one of the storage nodes in the bit cell 201 through respective inverters, which are discussed in detail below with respect to FIG. 3. In some embodiments, the PUF output 208-1, 208-2, and 208-3 are coupled to a first column multiplexer (MUX) 210-1 in a column decoder 106; the PUF output 208-4, 208-5, and 208-6 are coupled to a second column multiplexer (MUX) 210-2 in the column decoder 106; and the PUF output 208-7, 208-8, and 208-9 are coupled to a third column multiplexer (MUX) 210-3 in the column decoder 106. In some embodiments, the PUF output bars 209 from each of the bit cells 201 are coupled to the corresponding column MUX's 210.

For example, as shown in the illustrated embodiment of FIG. 2, the PUF cell array 102 includes columns "A," "B," and "C," and rows "a," "b," and "c," wherein column A includes respective BL 202-1, BLB 203-1, $V_{DD}$ 204-1, GND 205-1, PUF output 208-1, PUF output 208-4, and PUF output 208-7; column B includes respective BL 202-2, BLB 203-2, $V_{DD}$ 204-2, GND 205-2, PUF output 208-2, PUF output 208-5, and PUF output 208-8; column C includes respective BL 202-3, BLB 203-3, $V_{DD}$ 204-3, GND 205-3, PUF output 208-3, PUF output 208-6, and PUF output 208-9; row a includes a respective WL 206-1; row b includes a respective WL 206-2; and row c includes a respective WL 206-3.

Moreover, each column includes one or more bit cells that are each coupled to the column's respective BL and BLB, a different separate WL, BPC, and PUF output. For example, column A includes bit cells 200-1, 200-4, and 200-7, wherein the bit cells 200-1, 200-4, and 200-7 are each coupled to the BL 202-1, BLB 203-1, VDD 204-1, GND 205-1, WL's 206-1, 206-2, and 206-3, and PUF output 208-1, 208-4, and 208-7, respectively; column B includes bit cells 200-2, 200-5, and 200-8, wherein the bit cells 200-2, 200-5, and 200-8 are each coupled to the BL 202-2, BLB 203-2, VDD 204-2, GND 205-2, WL's 206-1, 206-2, and 206-3, and PUF output 208-2, 208-5, and 208-8, respectively; and column C includes bit cells 200-3, 200-6, and 200-9, wherein the bit cells 200-3, 200-6, and 200-9 are each coupled to the BL 202-3, BLB 203-3, VDD 204-3, GND 205-3, WL's 206-1, 206-2, and 206-3, and PUF output 208-3, 208-6, and 208-9, respectively.

As described above, each bit cell of the PUF cell array 102 (e.g., 201-1, 200-2, 201-3, 201-4, 200-5, 201-6, 200-7, 201-8, 201-9, etc.) may include a plurality of transistors. In some embodiments, a logical state stored in each bit cell may be written to the bit cell by applying either a high state (i.e., a logical "1") or a low state (i.e., a logical "0") through a corresponding BL, BLB, and WL. In some embodiments, a stable logical state of a bit cell can be achieved after stabilizing from a metastable logical state due to intrinsic differences in the bit cell (e.g., intrinsic strength differences between back-to-back coupled inverters in SRAM based bit cells). It should be also noted that FIG. 2 is only an example for illustration purposes and is not intended to be limiting. The type of signal lines in a PUF cell array 102 in this present disclosure can be arranged in different ways depending on the circuit layout design and types of bit cells used in the array. For example, the PUF output 208 and PUF output bar 209 can be arranged in parallel to the BL 202 and BLB 203.

In some embodiments, the WL 206 of each row is coupled to the bit cells 201 in the same row through a shared inverter 212. Specifically, the WL 206-1 is coupled to bit cells 201-1, 201-2, and 201-3 through an inverter 212-1; the WL 206-2 is coupled to bit cells 201-4, 201-5, and 201-6 through an inverter 212-2; and the WL 206-3 is coupled to bit cells 201-7, 201-8, and 201-9 through na inverter 212-3. In some embodiments, an inverter 212 coupled to the corresponding WL 206 comprises two transistors. Source terminal of a first transistor is coupled to drain terminal of a second transistor, which is further coupled to the WL 206; drain terminal of the first transistor and source terminal of the second transistor are coupled to VDD 204 and GND 205, respectively; and gate terminals of the first and second transistors of the inverter 212 are coupled together to the WL 206.

Figure 3A:
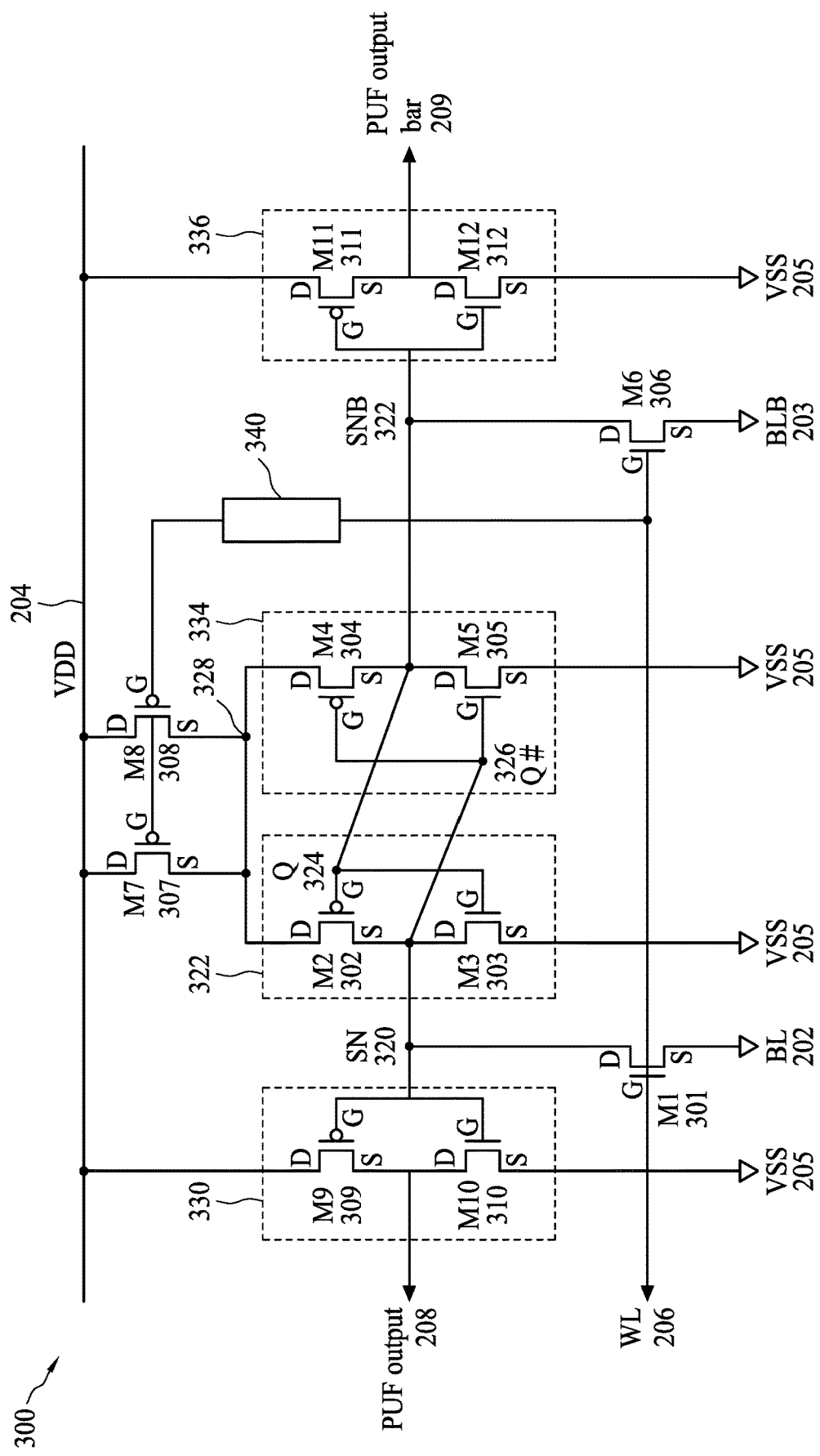
FIG. 3A illustrates an exemplary circuit diagram of a bit cell that is implemented as a 12-T SRAM bit cell, in accordance with some embodiments of the present disclosure.

FIG. 3A illustrates an exemplary circuit diagram of a bit cell 300 that is implemented as a 12-T SRAM bit cell, in accordance with some embodiments of the present disclosure. The bit cell 300 includes 12 transistors: M1 301, M2 302, M3 303, M4 304, M5 305, M6 306, M7 307, M8 308, M9 309, M10 310, M11 311, and M12 312. In some embodiments, the transistors M7 307 and M8 308 are enable transistors; the transistors M1 301 and M6 306 are access transistors. In the illustrated embodiment, BL 202 and BLB 203 are coupled together to ground.

In some embodiments, the transistors M2 302 and M3 303 are formed as a first inverter 332 on the left and the transistors M4 304 and M5 305 are formed as a second inverter 334 on the right wherein the first and second inverters 332/334 are cross-coupled to each other. More specifically, source terminal of the transistor M2 302 is coupled with drain terminal of the transistor M3 303 at a storage node (SN) 320. Similarly, source terminal of the transistor M4 304 is coupled with drain terminal of the transistor M5 305 at a storage node bar (SNB) 322. Gate terminals of the transistors M2 302 and M3 303 are coupled together at node Q 324, while gate terminals of the transistors M4 313 and M5 314 are coupled together at node Q # 326. Drain terminals of transistors M2 302 and M4 304 are coupled to source terminals of the enable transistors M7 307 and M8 308, respectively. In some embodiments, the source terminals of the enable transistors M7 308 and M8 308 are coupled together at nodes 328. In the illustrated embodiment of FIG. 3A, the PUF bit cell 300 comprises two enable transistors for the ease of layout. In some other embodiments, there is only one enable transistor with its source terminal coupled to both the drain terminals of M2 302 and M4 304. Drain terminals of the enable transistors M7 307 and M8 308 are coupled to VDD 204. Source terminals of transistors M3 303 and M5 305 are coupled to GND 205. Gate terminals of the enable transistors M7 307 and M8 308 are coupled together to the WL 206 through a delay component 340. In some embodiments, there can be one enable transistor between the VDD 204 and the cross-coupled inverters 332/334.

Further, SN 320 and SNB 322 are coupled to the PUF output 208 and PUF output bar 209 through a third inverter 330 and a fourth inverter 336, respectively. Specifically, the third inverter 330 and the fourth inverter 336 each comprises two transistors, i.e., M9 309 and M10 310 for the third inverter 330, and M11 311 and M12 312 for the fourth inverter 336. Gate terminals of transistors M9 309 and M10 310 are coupled together to SN 320 and gate terminals of transistors M11 311 and M12 312 are coupled together to SNB 322. Source terminals of transistors M9 309 and M11 311 are coupled to drain terminals of transistors M10 310 and M12 312 and further to the PUF output 208 and the PUF output bar 209, respectively. Drain terminals of transistors M9 309 and M11 311 are coupled to the VDD 204. Source terminals of transistors M10 310 and M12 312 are coupled to the GND 205.

In some embodiments, the transistors M1 301, M3 303, M5 305, M6 306, M10 309, and M12 312 each includes an NMOS transistor, and the transistors M2 302, M4 304, M7 307, M8 308, M9 309, and M11 311 each includes a PMOS transistor. Although the illustrated embodiments of FIG. 3A shows that M1-M12 are either NMOS or PMOS transistors, any of a variety of transistors or devices that are suitable for use in a memory device may be implemented as at least one of M1-M12 such as, for example, a bipolar junction transistor (BJT), a high-electron mobility transistor (HEMT), etc.

Figure 3B:
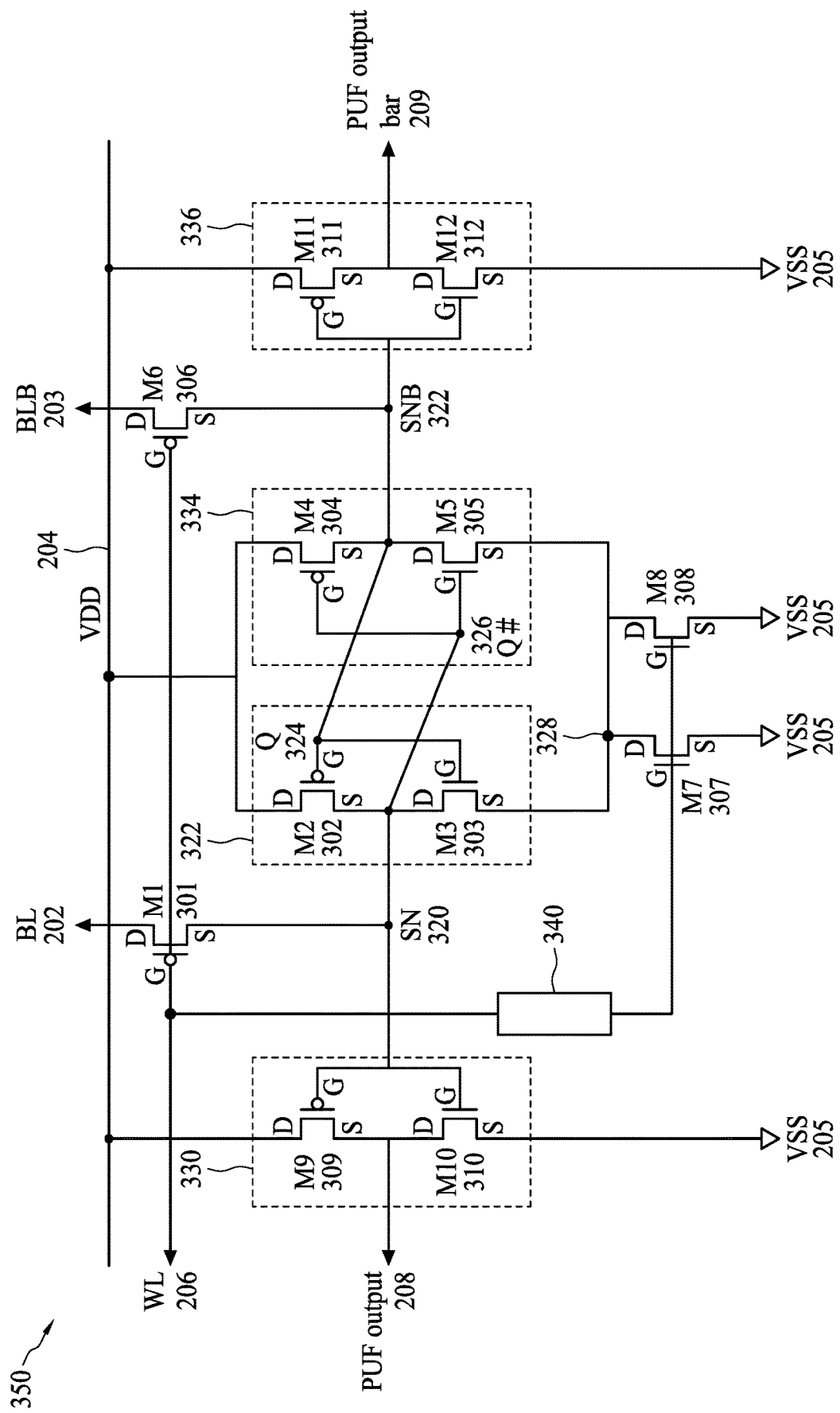
FIG. 3B illustrates an exemplary circuit diagram of a bit cell that is implemented as a 12-T SRAM bit cell, in accordance with some embodiments of the present disclosure.

FIG. 3B illustrates an exemplary circuit diagram of a bit cell 350 that is implemented as a 12-T SRAM bit cell, in accordance with some embodiments of the present disclosure. The bit cell 300 includes 12 transistors: M1 301, M2 302, M3 303, M4 304, M5 305, M6 306, M7 307, M8 308, M9 309, M10 310, M11 311, and M12 312. In some embodiments, the transistors M7 307 and M8 308 are enable transistors; and the transistors M1 301 and M6 306 are access transistors. In the illustrated embodiment, BL 202 and BLB 203 are coupled together to VDD 204.

In some embodiments, the transistors M2 302 and M3 303 are formed as a first inverter 332 on the left and the transistors M4 304 and M5 305 are formed as a second inverter 334 on the right wherein the first and second inverters 332/334 are cross-coupled to each other. More specifically, source terminal of the transistor M2 302 is coupled with drain terminal of the transistor M3 303 at a storage node (SN) 320. Similarly, source terminal of the transistor M4 304 is coupled with drain terminal of the transistor M5 305 at a storage node bar (SNB) 322. Gate terminals of the transistors M2 302 and M3 303 are coupled together at node Q 324, while gate terminals of the transistors M4 313 and M5 314 are coupled together at node Q # 326. Source terminals of transistors M3 303 and M5 305 are coupled to drain terminals of the enable transistors M7 307 and M8 308, respectively. In some embodiments, the drain terminals of the enable transistors M7 308 and M8 308 are coupled together at nodes 328. In some embodiments, there is only one enable transistor with its drain terminal coupled to both the source terminals of M3 303 and M5 305. Source terminals of the enable transistors M7 307 and M8 308 are coupled to GND 205. Drain terminals of transistors M2 302 and M4 304 are coupled to VDD 204. Gate terminals of the enable transistors M7 307 and M8 308 are coupled together to the WL 206 through a delay component 340.

Further, SN 320 and SNB 322 are coupled to the PUF output 208 and PUF output bar 209 through a third inverter 330 and a fourth inverter 336, respectively. Specifically, the third inverter 330 and the fourth inverter 336 each comprises two transistors, i.e., M9 309 and M10 310 for the third inverter 330, and M11 311 and M12 312 for the fourth inverter 336. Gate terminals of transistors M9 309 and M10 310 are coupled together to SN 320 and gate terminals of transistors M11 311 and M12 312 are coupled together to SNB 322. Source terminals of transistors M9 309 and M11 311 are coupled to drain terminals of transistors M10 310 and M12 312 and further to the PUF output 208 and the PUF output bar 209, respectively. Drain terminals of transistors M9 309 and M11 311 are coupled to the VDD 204. Source terminals of transistors M10 310 and M12 312 are coupled to the GND 205.

In some embodiments, the transistors M3 303, M5 305, M10 309, and M12 312 each includes an NMOS transistor, and the transistors M1 301, M2 302, M4 304, M6 306, M7 307, M8 308, M9 309, and M11 311 each includes a PMOS transistor. Although the illustrated embodiments of FIG. 3B shows that M1-M12 are either NMOS or PMOS transistors, any of a variety of transistors or devices that are suitable for use in a memory device may be implemented as at least one of M1-M12 such as, for example, a bipolar junction transistor (BJT), a high-electron mobility transistor (HEMT), etc.

Figure 4:
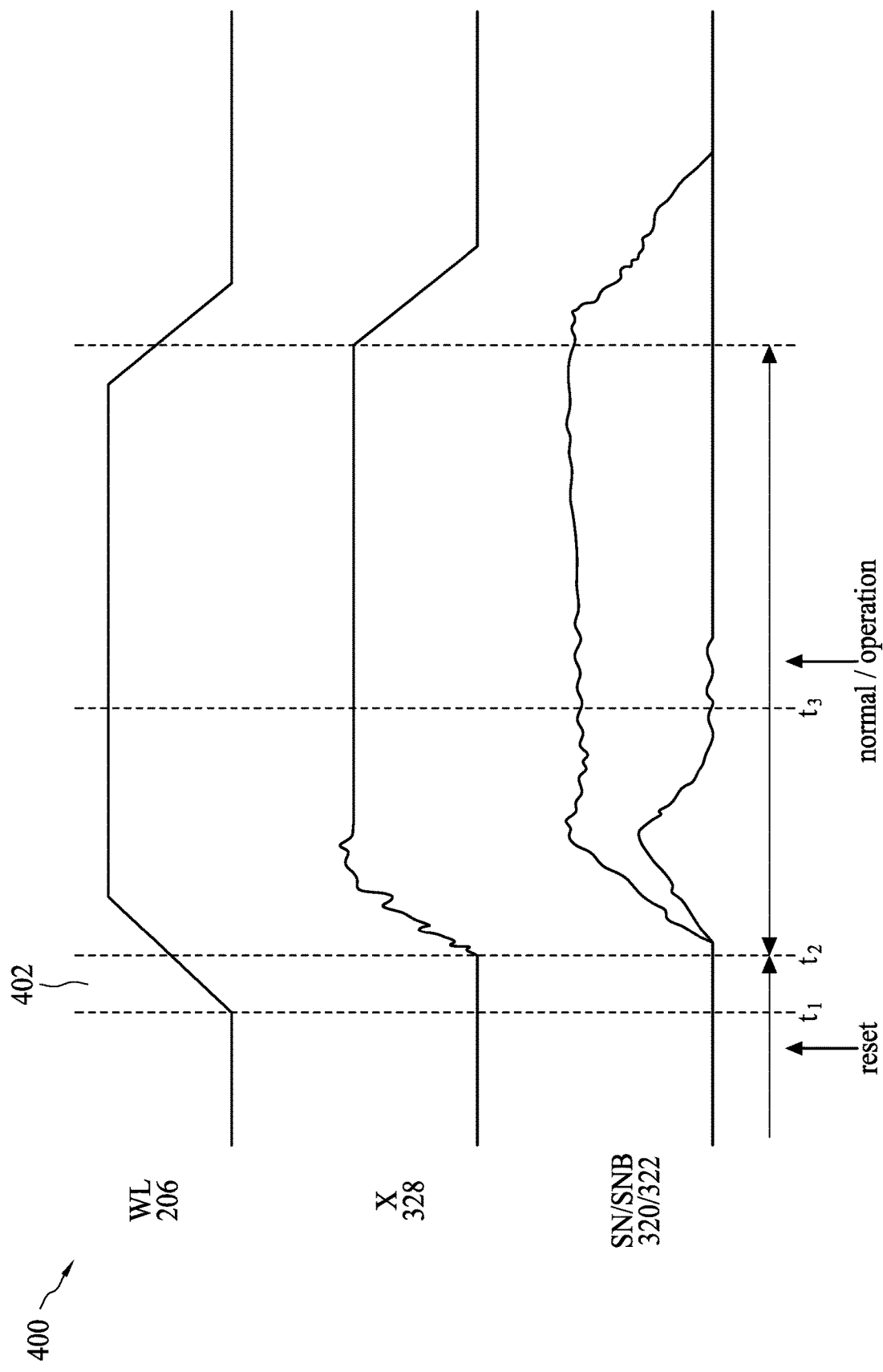
FIG. 4 illustrates waveforms of signals in a bit cell of a PUF cell array, in accordance with some embodiments of the present disclosure.

FIG. 4 illustrates waveforms 400 of signals in a bit cell 300 of a PUF cell array 102, in accordance with some embodiments of the present disclosure. During a reset phase, the WL 206 is pulled down and thus the voltage level after the inverter 212 is pulled up, the access transistors M1 301 and M6 306 are turned on which allow a discharge of the SN 320 and SNB 322 to GND, pre-discharging the bit cell 300 with metastable logical states (i.e., logic "0" s) on the SN 320 and SNB 322. At the same time, pulling down the WL 206 also turns off the transistors M7 307 and M8 308, which disables the two cross-coupled inverters 332/334, storing the metastable logical states on the SN 320 and SNB 322.

During a normal operation phase to generate a PUF output, the WL 206 is pulled up at t1 which turns off the access transistors M1 301 and M6 306. Pulling up the voltage on the WL 206 also turns on the enable transistors M7 307 and M8 308 and starts to charge the node 328 at t2, which is separated from the start of the pulling-up of the WL 206 by a time gap 402 (i.e., t2-t1). In some embodiments, this time gap 402 can be further controlled by the delay circuit 340. The increasing voltage on the node 328 from a resting voltage then enables the cross-coupled inverters 332/334 in the bit cell 300. In some embodiments, the resting voltage of the node 390 is smaller than a threshold voltage of one of the enable transistors M7 307 or M8 308. In some embodiment, the threshold voltage is a first threshold voltage of the transistor M7 307 and the first threshold voltage of the transistor M7 307 is smaller than a second threshold voltage of the transistor M8 308. The metastable logical states previously stored on the SN/SNB 320/322 cannot be sustained once the cross-coupled inverters 332/334 are enabled due to its particular back-to-back configuration of the two inverters and the strength difference between the two cross-coupled inverters 332/334 caused by intrinsic process variations during fabrication. The small mismatch of strength in the cross-coupled inverters 332/334 will be eventually amplified by the positive feedback of the cross-coupled inverters 332/334 and will eventually generate either logic "1" or logic "0" on the SN 320/SNB 322 at time t3. Since the design is highly symmetric and the only randomness is caused by the fabrication process of the transistors in the cross-coupled inverters, the binary output of the logical states, when the plurality of bit cells 300 are stabilized at t3 after being enabled by the enable transistors M7 307 and M8 308, are unique, random and non-traceable. Finally, the logical states on SN 320 and SNB 322 are further inverted by the respective inverters 330 and 336 before read out on to the PUF output 208 and PUF output bar 209, respectively.

Figure 5:
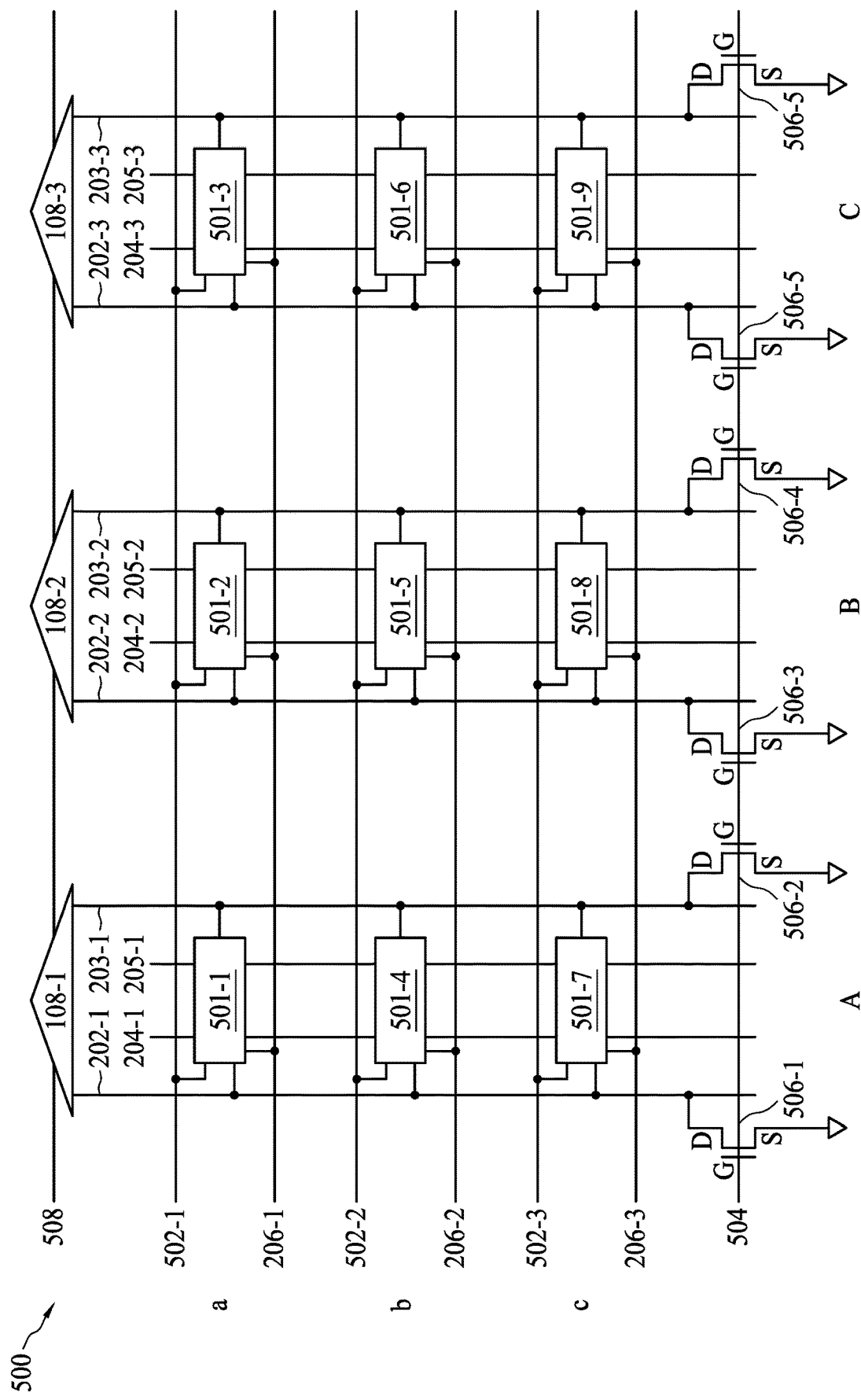
FIG. 5 illustrates an exemplary circuit diagram of a PUF cell array comprising a plurality of bit cells, in accordance with some embodiments of present disclosure.

FIG. 5 illustrates an exemplary circuit diagram of a PUF cell array 500 comprising a plurality of bit cells 501, in accordance with some embodiments of present disclosure. In some embodiments, the PUF cell array 500 includes a plurality of bit cells 501-1, 501-2, 501-3, 501-4, 501-5, 501-6, 201-7, 501-8, and up to 501-9. Although only 9 bit cells are shown, any desired number of bit cells 501 may be included in the PUF cell array 500 while remaining within the scope of the present disclosure. As described above, the bit cells 501-1, 501-2, 501-3, 501-4, 501-5, 501-6, 501-7, 501-8, and 501-9 are arranged in a column-row configuration. More specifically, in some embodiments, the PUF cell array 500 includes bit lines (BL's) 202-1, 202-2, and 202-3 arranged in parallel, bit line bars (BLB's) 203-1, 203-2, and 203-3 also arranged in parallel, and word lines (WL's) 206-1, 206-2, and 206-3. The WL's 206 are arranged in parallel orthogonally to the BL's 202 and BLB's 203. In some embodiments, the PUF cell array 500 also includes positive supply voltage power ($V_{DD}$) 204-1, 204-2, and 204-3, and zero reference voltage (GND) 205-1, 205-2 and 205-3. As such, the PUF cell array 500 may include a first plurality of columns (e.g., arranged vertically), a second plurality of rows (e.g., arranged horizontally), wherein each column includes a respective pair of BL 202, BLB 203, $V_{DD}$ 204, GND 205, and each row includes a respective WL 206. In the illustrated embodiments, the 9 bit cells 501 in the PUF cell array 500 may also provide corresponding PUF outputs which are directly coupled to one of the storage nodes in the bit cell 201 through respective BL 202 and BLB 203, which are discussed in detail below with respect to FIG. 6. In some embodiments, the BL 202 and BLB 203 of each column of the PUF cell array 500 are coupled to a sense amplifier 108.

For example, as shown in the illustrated embodiment of FIG. 5, the PUF cell array 500 includes columns "A," "B," and "C," and rows "a," "b," and "c," wherein column A includes respective BL 202-1, BLB 203-1, $V_{DD}$ 204-1, and GND 205-1; column B includes respective BL 202-2, BLB 203-2, $V_{DD}$ 204-2, and GND 205-2; column C includes respective BL 202-3, BLB 203-3, $V_{DD}$ 204-3, and GND 205-3; row a includes a respective WL 206-1 and EN 502-1; row b includes a respective WL 206-2 and EN 502-2; and row c includes a respective WL 206-3 and EN 502-3. Furthermore, columns A, B and C also includes respective sense amplifiers 108-1, 108-2, and 108-3.

Moreover, each column includes one or more bit cells that are each coupled to the column's respective BL and BLB, a different separate WL and EN. For example, column A includes bit cells 501-1, 501-4, and 501-7, wherein the bit cells 501-1, 501-4, and 501-7 are each coupled to the BL 202-1, BLB 203-1, VDD 204-1, GND 205-1, WL's 206-1, 206-2, and 206-3, and EN 502-1, 502-2 and 502-3, respectively; column B includes bit cells 501-2, 501-5, and 501-8, wherein the bit cells 501-2, 501-5, and 501-8 are each coupled to the BL 202-2, BLB 203-2, VDD 204-2, GND 205-2, WL's 206-1, 206-2, and 206-3, and EN 502-1, 502-2 and 502-3, respectively; and column C includes bit cells 501-3, 501-6, and 501-9, wherein the bit cells 501-3, 501-6, and 501-9 are each coupled to the BL 202-3, BLB 203-3, VDD 204-3, GND 205-3, WL's 206-1, 206-2, and 206-3, and EN 502-1, 502-2 and 502-3, respectively.

As described above, each bit cell of the PUF cell array 500 (e.g., 501-1, 501-2, 501-3, 501-4, 500-5, 501-6, 501-7, 501-8, 501-9, etc.) may include a plurality of transistors. In some embodiments, a logical state stored in each bit cell may be written to the bit cell by applying either a high state (i.e., a logical "1") or a low state (i.e., a logical "0") through a corresponding BL 202, BLB 203, and WL 206. In some embodiments, a stable logical state of a bit cell can be achieved after stabilizing from a metastable logical state due to intrinsic differences in the bit cell (e.g., intrinsic strength differences between back-to-back coupled inverters in SRAM based bit cells). It should be also noted that FIG. 5 is only an example for illustration purposes and is not intended to be limiting. The type of signal lines in a PUF cell array 500 in this present disclosure can be arranged in different ways depending on the circuit layout design and types of bit cells used in the PUF cell array.

In some embodiments, the WL 206 and the EN 502 of each row are coupled to the bit cells 501 in the same row. Specifically, the WL 206-1 and the EN 502-1 are coupled to bit cells 501-1, 501-2, and 501-3; the WL 206-2 and the EN 502-2 are coupled to bit cells 501-4, 501-5, and 501-6; and the WL 206-3 and the EN 502-3 are coupled to bit cells 501-7, 501-8, and 501-9. In some embodiments, the BL 202 and BLB 203 of each column each is coupled to a pre-discharge transistor 506. Referring to the illustrated embodiment in FIG. 5, the BL 202-1 and BLB 203-1 of column A are coupled to drain terminals of pre-discharge transistors 506-1 and 506-2, respectively; the BL 202-2 and BLB 203-2 of column B are coupled to drain terminals of pre-discharge transistors 506-3 and 506-4, respectively; and the BL 202-3 and BLB 203-3 of column C are coupled to drain terminals of pre-discharge transistors 506-5 and 506-6, respectively. Source terminals of pre-discharge transistors 506 are coupled to GND. Gate terminals of pre-discharge transistors 506 are coupled to a common pre-discharge line 504 of the PUF cell array 500. Furthermore, the BL 202 and BL 203 of each column are coupled to a corresponding sense amplifier 108. Specifically, the BL 202-1 and BLB 203-1 of the first column A are coupled to a first SA 108-1; the BL 202-2 and BLB 203-2 of the first column B are coupled to a first SA 108-2; and the BL 202-3 and BLB 203-3 of the first column C are coupled to a first SA 108-3. The 3 SA 108 are controlled by a sense amplifier enable (SAEN) 508.

Figure 6:
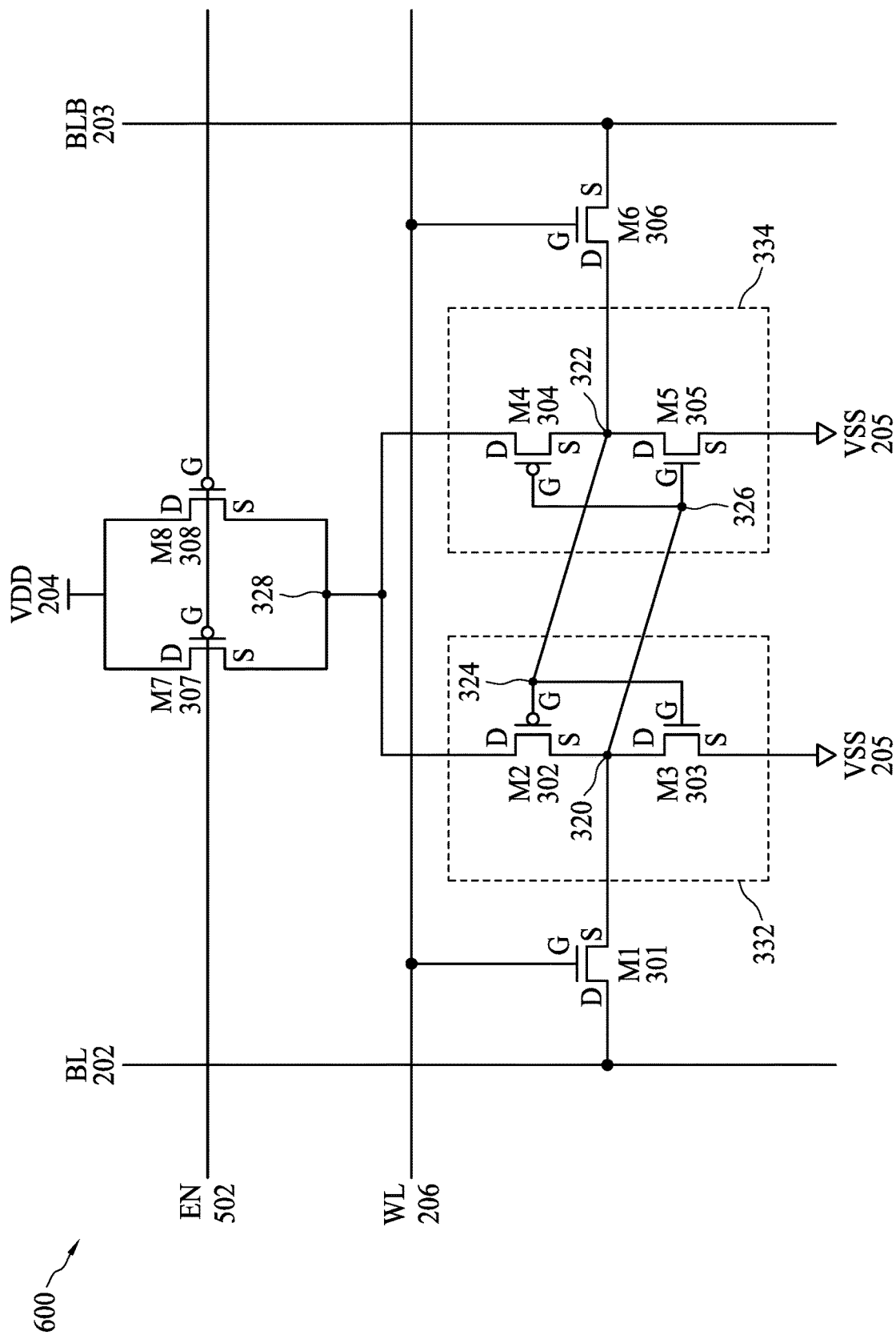
FIG. 6 illustrates an exemplary circuit diagram of a bit cell that is implemented as an 8-T SRAM bit cell, in accordance with some embodiments of the present disclosure.

FIG. 6 illustrates an exemplary circuit diagram of a bit cell 600 that is implemented as an 8-T SRAM bit cell, in accordance with some embodiments of the present disclosure. The bit cell 600 includes 8 transistors: M1 301, M2 302, M3 303, M4 304, M5 305, M6 306, M7 307, and M8 308. In some embodiments, the transistors M7 307 and M8 308 are enable transistors; and the transistors M1 301 and M6 306 are access transistors. In some embodiments, the bit cell 600 may further comprise 2 pre-discharge transistors M12 606 and M13 608 coupled to the BL 202 and BLB 203, respectively. In certain embodiments, the pre-discharge transistors M12 606 and M13 608 can be shared by a plurality of bit cells 600 in one column.

In some embodiments, the transistors M2 302 and M3 303 are formed as a first inverter 332 on the left and the transistors M4 304 and M5 305 are formed as a second inverter 334 on the right wherein the first and second inverters 332/334 are cross-coupled to each other. More specifically, source terminal of the transistor M2 302 is coupled with drain terminal of the transistor M3 303 at a storage node (SN) 320. Similarly, source terminal of the transistor M4 304 is coupled with drain terminal of the transistor M5 305 at a storage node bar (SNB) 322. Gate terminals of the transistors M2 302 and M3 303 are coupled together at node 324, while gate terminals of the transistors M4 304 and M5 305 are coupled together at node 326. Drain terminals of transistors M2 302 and M4 043 are coupled to source terminals of the enable transistor M7 307 and M8 308 at nodes 328, respectively. Drain terminals of the enable transistor M7 307 and M8 308 are coupled to a VDD 204. Source terminals of transistors M3 303 and M5 305 are coupled to GND 205. Gate terminals of the enable transistors M7 307 and M8 308 are coupled to an enable line (EN) 502. In some embodiments, there is only one enable transistor with its source terminal coupled to both of the drain terminals of the transistors M2 302 and M4 304.

Further, node 324 of the first inverter 332 is coupled to SNB 322 and node 326 of the second inverter 334 is coupled to SN 320. The transistors M1 301 and M6 306 are typically referred to as access transistors of the bit cell 600. The first inverter 332 is coupled to source terminal of the transistor M1 301 at SN 320, and the second inverter 334 is coupled to drain terminal of the transistor M6 306 at SNB 322. In addition to being coupled to the cross-coupled inverters 332/334, the transistors M1 301 and M6 306 are both coupled to the BL 202/WL 206 and BLB 203/WL 206, respectively. Specifically, gate terminals of the access transistors M1 301 and M6 306 are coupled to the WL 206. Drain terminal of the access transistor M1 301 and source terminal of the access transistor M6 306 are coupled to BL 202 and BLB 203, respectively.

In some embodiments, the transistors M1 301, M3 303, M5 305, and M6 306, each includes an NMOS transistor, and the transistors M2 302, M4 304, M7 307, and M8 308, each includes a PMOS transistor. Although the illustrated embodiments of FIG. 6 shows that M1-M8 are either NMOS or PMOS transistors, any of a variety of transistors or devices that are suitable for use in a memory device may be implemented as at least one of M1-M8 such as, for example, a bipolar junction transistor (BJT), a high-electron mobility transistor (HEMT), etc.

Figure 7:
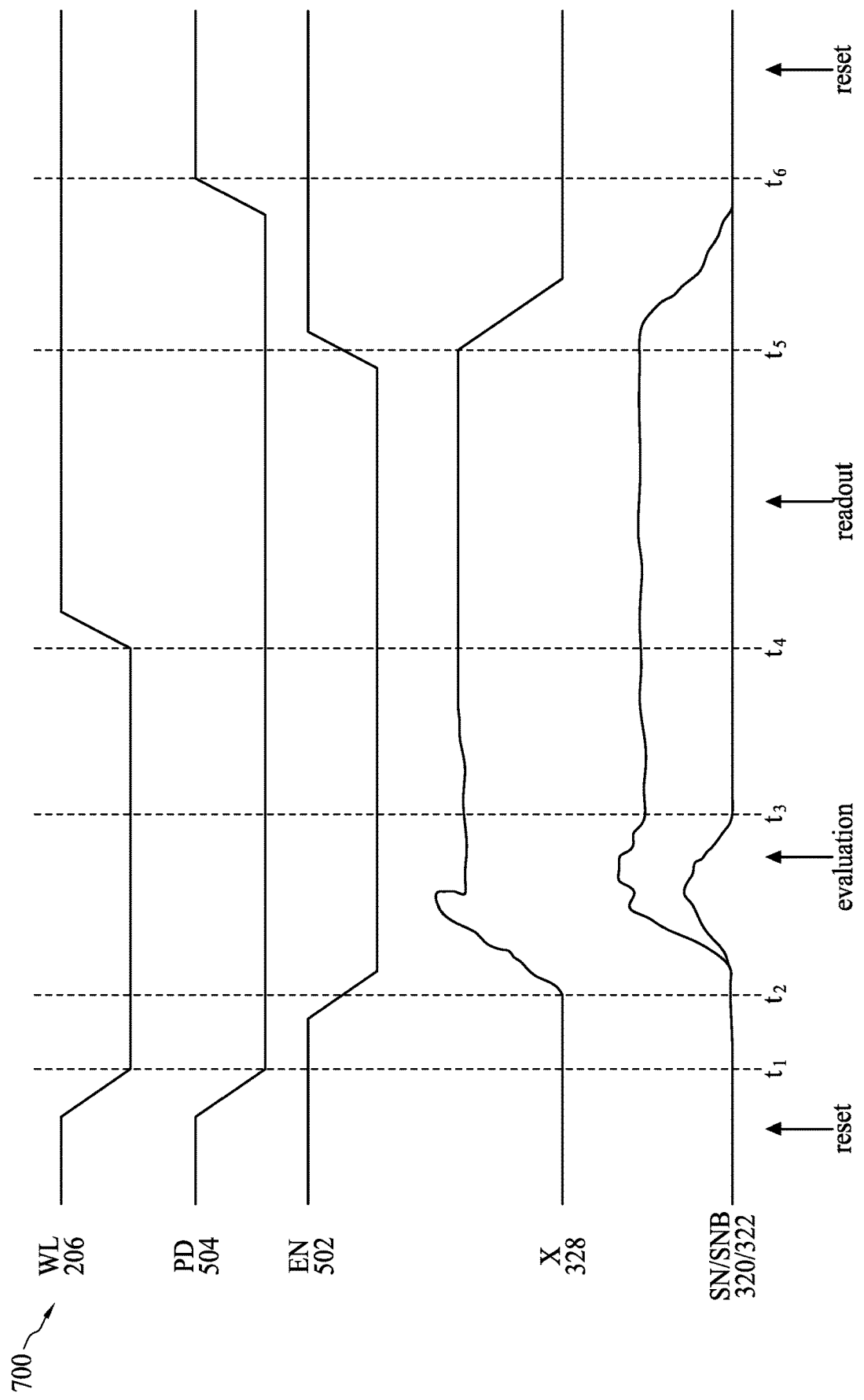
FIG. 7 illustrates waveforms of signals in a bit cell of a PUF cell array, in accordance with some embodiments of the present disclosure.

FIG. 7 illustrates waveforms 700 of signals in a bit cell 600 of a PUF cell array 500, in accordance with some embodiments of the present disclosure. During a reset phase, the PD 504 is pulled up so as to pull the voltages on the BL 202/BLB 203 to GND. The WL 206 is pulled up, the access transistors M1 310 and M6 315 are turned on, which allows discharge of the SN 320 and SNB 322 to GND, pre-charging the bit cell 600 with metastable logical states (i.e., logic "0" s) on the SN 350 and SNB 360. The EN 502 is also pulled down to turn off the transistor M7 382, which disables the two cross-coupled inverters 332/334, storing the metastable logical states on the SN 320 and SNB 322.

During a normal operation phase to generate a PUF output, the WL 206 and the PD 504 both are pulled down at t1 which turns off the access transistors M1 301 and M6 306. Pulling down the voltage on the PD 504 also turns off the pre-discharge transistors M12 606 and M13 608. The EN 502 is then pulled down to turn on the enable transistors M7 307/M8 308 and starts to charge the node 390 at t2. The increasing voltage level on the nodes 328 then enables the cross-coupled inverters 332/334 in the bit cell 600. The metastable logical states previously stored on the SN/SNB 320/322 cannot be sustained once the cross-coupled inverters 332/334 are enabled due to its particular back-to-back configuration of the two inverters and the strength difference between the two cross-coupled inverters 332/334 caused by intrinsic process variations during fabrication. The small mismatch of strength in the cross-coupled inverters 332/334 especially in the transistors M2 302 and M4 304 will be eventually amplified by the positive feedback of the cross-coupled inverters 332/334 and will eventually generate either logic "1" or logic "0" on the SN 320/SNB 322 at time t3. Since the design is highly symmetric and the only randomness is caused by the fabrication process of the transistors in the cross-coupled inverters 332/334, the binary output of the logical states, when the plurality of bit cells 600 are stabilized at t3 after being enabled by the enable transistors M7 307/M8 308, are unique, random and non-traceable.

During a read-out phase to determine a logical state of the bit cell 600, the WL 206 is pulled up at t4 which enables the access transistors M1 301/M6 306 which allows the logical states on SN 350 and SNB 360 further read out on to the BL 202 and BLB 203, respectively. To reset the bit cell 600 again, the EN 502 is pulled up to turn off the enable transistors M7 307/M8 308 which disables the two cross-coupled inverters 332/334. The PD 504 is then pulled up at t6 to discharge the BL 202 and BLB 203 as well as the SN 320 and SNB 322 to GND.

Figure 8:
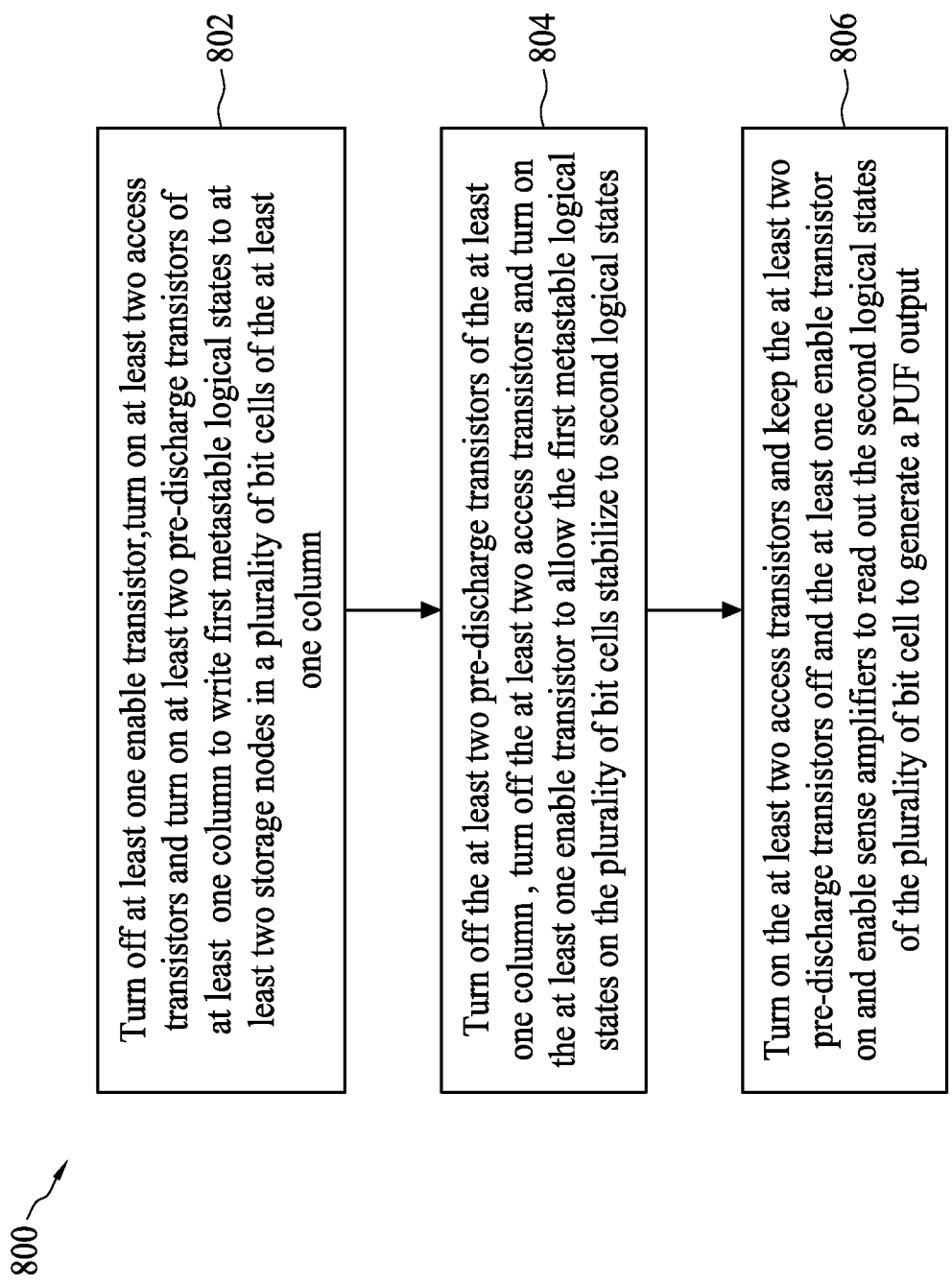
FIG. 8 illustrates a flow chart of a method 800 to generate a PUF output using a PUF cell array 102 comprising a plurality of bit cells 600, in accordance with some embodiments of present disclosure.

FIG. 8 illustrates a flow chart of a method 800 to generate a PUF output using a PUF cell array 102 comprising a plurality of bit cells 600, in accordance with some embodiments of present disclosure. In some embodiments, the operations of method 800 are performed by the respective components illustrated in FIGS. 1, 2 and 6. For purposes of discussion, the following embodiment of the method 800 will be described in conjunction with FIGS. 1, 2, and 6. The illustrated embodiment of the method 800 is merely an example for generating a masking map. Therefore, it should be understood that any of a variety of operations may be omitted, re-sequenced, and/or added while remaining within the scope of the present disclosure.

The method 800 starts with operation 802 in which enable transistors M7 307/M8 308 of each of a plurality of bit cells 600 are turned off, two access transistors M1 301/M6 306 of each of a plurality of bit cells are turned on, and two pre-discharge transistors M12 504/M13 606 of a plurality of bit cells in a column are turned on so as to reset the BL 202 and BLB 203, and to write first metastable logical states to two storage nodes SN 320 and SNB 322 in each of a plurality of bit cells 600, according to some embodiments. In some embodiments, turning on the access transistors M1 301/M6 306 are configured by pulling up the voltage level on a wordline (WL) 206 which is controlled by a PUF control circuit 112. In some embodiments, the turning off of the enable transistors M7 307/M8 308 is configured by pulling up the voltage level on an enable (EN) line 502. In some embodiments, the turning off the pre-discharge transistors M12 606/M13 608 is configured by pulling up the voltage level on a pre-discharge (PD) line 504. In some embodiments, turning off the two enable transistors M7 307/M8 308 disables the cross-coupled inverters 332/334, turning on the pre-discharge transistors M12 606/M13 608 resets the BL 202/BLB 203 to GND, and turning on the access transistors M1 301/M6 306 is able to write 0's on the two storage nodes SN 320 and SNB 322 coupled to the respective two access transistors M1 301/M6 306. In some embodiments, operation 802 is performed one or multiple rows at a time depending on the size of the array.

The method 800 continues to operation 804 in which the pre-discharge transistors M12 606/M13 608 are turned off, the two access transistors M1 301/M6 306 are turned off, and the enable transistors M7 307/M8 308 is turned on so as to allow the first metastable logical states in the plurality of bit cells 600 to stabilize to second logical states. In some embodiments, the PUF control circuit 112 is configured to pull down the voltage on the WL 206 to turn off the two access transistors M1 301/M6 306, to pull down the PD 504 to turn off the pre-discharge transistors M12 606/M13 608 and to pull down the EN 502 to turn on the enable transistors M7 307/M8 308. Turning on the enable transistors M7 307/M8 308 allows to charge a node 328. The increasing voltage on the nodes 328 then enables the cross-coupled inverters 332/334 in the bit cell 600. The metastable logical states previously stored on the SN/SNB 320/322 cannot be sustained once the cross-coupled inverters 332/334 are enabled due to its particular back-to-back configuration of the two inverters and the strength difference between the two cross-coupled inverters 332/334 caused by intrinsic process variations during fabrication. The small mismatch of strength in the cross-coupled inverters 332/334 especially in the transistors M2 302 and M4 304 will be eventually amplified by the positive feedback of the cross-coupled inverters 332/334 and will eventually generate either logic "1" or logic "0" on the SN 320/SNB 322. Since the design is highly symmetric and the only randomness is caused by the fabrication process of the transistors in the cross-coupled inverters, the binary output of the logical states, when the plurality of bit cells 600 are stabilized after being enabled by the enable transistors M7 307/M8 308, are unique, random and non-traceable. In some embodiments, all the bit cells 600 in the PUF cell array 102 can be evaluated at the same time. In some other embodiments, a plurality of bit cells 600 in one or more rows are evaluated at the same time. In some embodiments, the sense amplifier 108 is enabled in this evaluation process.

The method 800 continues to operation 806 in which the two access transistors M1 301/M6 306 are turned on and the cross coupled inverters are enabled, while the two pre-discharge transistors M12 606/M13 608 are kept off and the enable transistors M7 307/M8 308 are kept on, so as to read out the second logical states of the plurality of bit cells 600 to generate a PUF output. In some embodiments, a plurality of bit cells 600 in one row can be read out at the same time. In some embodiments, bit cells 600 in a plurality of rows can be read out separately to produce a PUF output with enough bits. In some other embodiments, the pre-discharge transistors M12 606 and M13 608 are turned on and off again to discharge the BL 202 and BL 203, before turning on the access transistors M1 301/M6 306 are turned on to read the second logical states to the BL 202/BLB 203. Thus, the method 800 to generate a PUF signature using a PUF generator based on pre-discharge transistors provides an improved number of stable bit cells and overall improved stability of the PUF generator.

Figure 9:
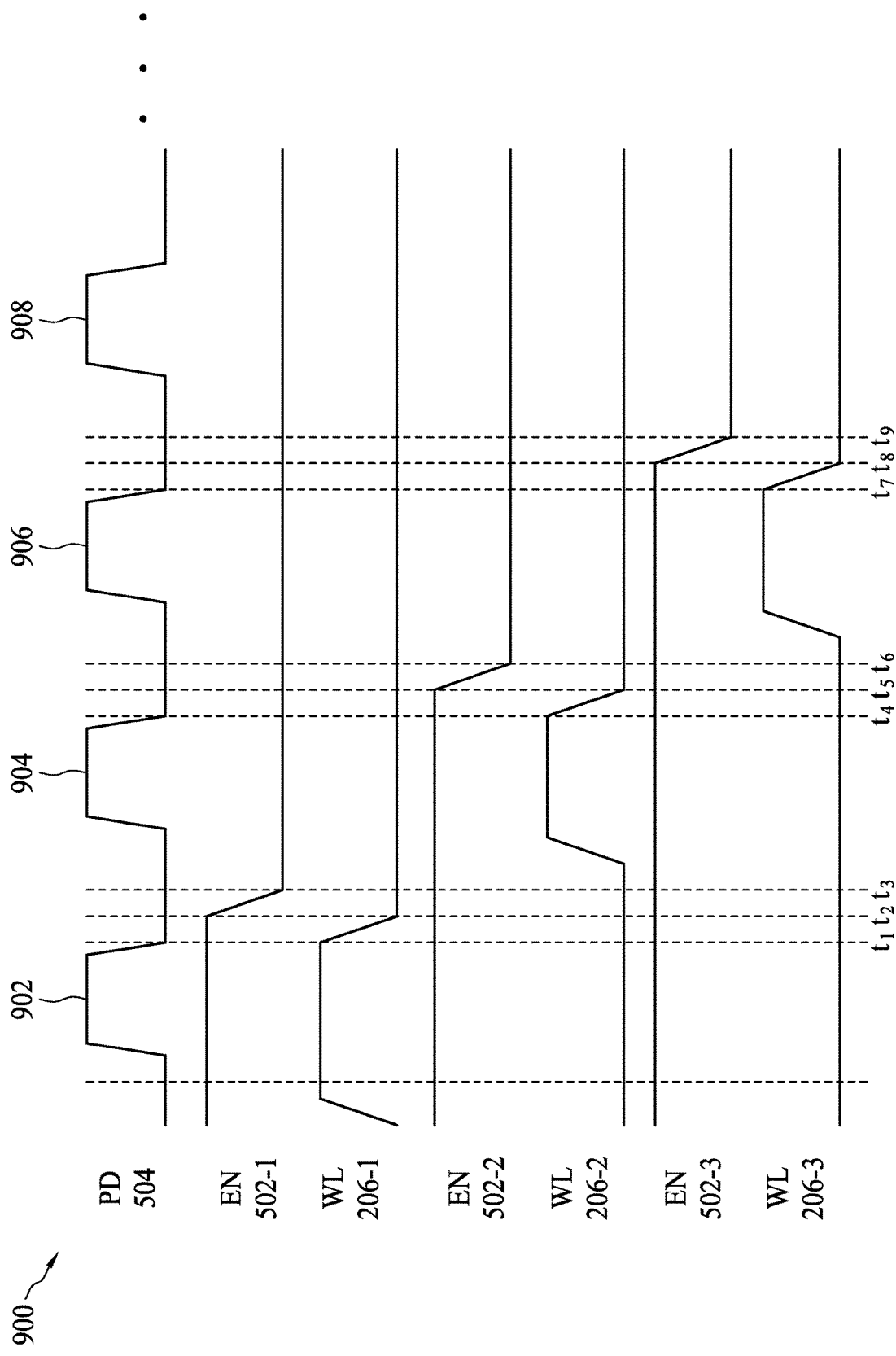
FIG. 9 illustrates waveforms of signals in a PUF cell array, in accordance with some embodiments of the present disclosure.

FIG. 9 illustrates waveforms 900 of signals to set logical states in row-by-row fashion in a PUF cell array 500, in accordance with some embodiments of the present disclosure. A pre-discharge 504 is a pulsed signal comprising a first pulse 902, a second pulse 904, a third pulse 906 and a fourth pulse 908. A first word line (WL) 206-1 is pulled up before the pulling-up of the first pulse 902 and then pulled down after the pulling-down of the first pulse 902 so as to enable a plurality of bit cells in a first row by turning on the corresponding access transistors M1 301/M6 306 of the corresponding bit cells, while the enable transistors M7 307/M8 308 are remained off. After pulling down the WL 206-1, the corresponding EN 502-1 is then pulled down so as to enable the two cross-coupled inverters in the plurality of bit cells of the first row of the PUF cell array 500 to stabilize from a metal stable logical state. Similarly, a second word line (WL) 206-2 is pulled up before the pulling-up of the second pulse 904 and then pulled down after the pulling-down of the second pulse 904 so as to enable a plurality of bit cells in a second row by turning on the corresponding access transistors M1 301/M6 306 of the corresponding bit cells, while the enable transistors M7 307/M8 308 are remained off. After pulling down the WL 206-2, the corresponding EN 502-1 is then pulled down so as to enable the two cross-coupled inverters in the plurality of bit cells of the second row of the PUF cell array 500 to stabilize from a metal stable logical state. Further, a third word line (WL) 206-3 is pulled up before the pulling-up of the third pulse 906 and then pulled down after the pulling-down of the third pulse 906 so as to enable a plurality of bit cells in a third row by turning on the corresponding access transistors M1 301/M6 306 of the corresponding bit cells, while the enable transistors M7 307/M8 308 are remained off. After pulling down the WL 206-3, the corresponding EN 502-3 is then pulled down so as to enable the two cross-coupled inverters in the plurality of bit cells of the second row of the PUF cell array 500 to stabilize from a metal stable logical state.

In one embodiment, a physical unclonable function (PUF) generator includes: a PUF cell array comprising a plurality of bit cells configured in a plurality of columns and at least one row, wherein each of the plurality of columns is coupled to at least two pre-discharge transistors, and each of the plurality of bit cells comprises at least one enable transistor, at least two access transistors, and at least two storage nodes, wherein the at least two storage nodes of each of the plurality of bit cells in each of the plurality of columns are coupled to the two pre-discharge transistors of the corresponding column through the corresponding at least two access transistors, wherein the at least two pre-discharge transistors are further coupled to a second voltage, and a PUF control circuit coupled to the PUF cell array, wherein the PUF control circuit is configured to access the plurality of bit cells to pre-charge the at least two storage nodes with substantially the same voltages allowing each of the plurality of bit cells having a first metastable logical state; to determine a second logical state; and based on the determined second logical states of the plurality of bit cells, to generate a PUF signature.

In another embodiment, a method for generating a physical unclonable function (PUF) signature includes: equalizing at least two storage nodes with substantially the same voltages in each of a plurality of bit cells in a plurality of column and at least one row of a PUF cell array by turning on at least two pre-discharge transistors coupled to each of the plurality of column allowing each of the plurality of bit cells having a first metastable logical state, wherein each of the plurality of bit cells comprises at least one enable transistor, at least two access transistors, and at least two storage nodes, wherein the at least two storage nodes of each of the plurality of bit cells in each of the plurality of columns are coupled to the two pre-discharge transistors of the corresponding column through the corresponding at least two access transistors, wherein the at least two pre-discharge transistors are further coupled to a second voltage; stabilizing the first metastable logical state in each of the plurality of bit cells to a second logical state by turning on the at least one enable transistor and turning off the at least two access transistors allowing each of the plurality of bit cells to determine a second logical state; and generating a PUF signature by turning on the at least two access transistors to read out the second logical states of the plurality of bit cells.

Yet, in another embodiment, a physical unclonable function (PUF) generator includes: a PUF cell array comprising a plurality of bit cells configured in a plurality of columns and at least one row, wherein each of the plurality of columns is coupled to at least two pre-discharge transistors, and each of the plurality of bit cells comprises at least one enable transistor, at least two access transistors, at least two storage nodes, and two cross-coupled inverters, wherein the at least two storage nodes of each of the plurality of bit cells in each of the plurality of columns are coupled to the two pre-discharge transistors of the corresponding column through the corresponding at least two access transistors, wherein the at least two pre-discharge transistors are further coupled to a second voltage, wherein each of the two cross-coupled inverters comprises one NMOS and one PMOS transistors, and a PUF control circuit coupled to the PUF cell array, wherein the PUF control circuit is configured to access the plurality of bit cells to pre-charge the at least two storage nodes with substantially the same voltages allowing each of the plurality of bit cell having a first metastable logical state; to determine a second logical state; and based on the determined second logical states of the plurality of bit cells, to generate a PUF signature.

The foregoing outlines features of several embodiments so that those ordinary skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A physical unclonable function (PUF) generator comprising:
a PUF cell array comprising a plurality of bit cells configured in a plurality of columns and at least one row, wherein each of the plurality of columns is coupled to at least two pre-discharge transistors, and each of the plurality of bit cells comprises at least one enable transistor, at least two access transistors, and at least two storage nodes, wherein the at least two storage nodes of each of the plurality of bit cells in each of the plurality of columns are coupled to the two pre-discharge transistors of the corresponding column through the corresponding at least two access transistors, wherein the at least two pre-discharge transistors are further coupled to a second voltage, and a PUF control circuit coupled to the PUF cell array, wherein the PUF control circuit is configured to access the plurality of bit cells to pre-charge the at least two storage nodes with substantially the same voltages allowing each of the plurality of bit cells having a first metastable logical state; to determine a second logical state; and based on the determined second logical states of the plurality of bit cells, to generate a PUF signature.

2. The PUF generator of claim 1, wherein the at least two access transistors each is coupled between a bitline (BL) and one corresponding storage node.

3. The PUF generator of claim 1, wherein the at least two access transistors each comprise an n-type metal oxide semiconductor (NMOS) transistor and the at least one enable transistor comprises a p-type metal oxide semiconductor (PMOS) transistor.

4. The PUF generator of claim 1, wherein the at least one enable transistor is coupled between two cross-coupled inverters and a first voltage.

5. The PUF generator of claim 1, wherein the at least two pre-discharge transistors each is coupled between the BL and the second voltage.

6. The PUF generator of claim 1, wherein the plurality of bit cells each further comprises two cross-coupled inverters each comprising one n-type metal oxide semiconductor (NMOS) and one p-type metal oxide semiconductor (PMOS) transistors.

7. The PUF generator of claim 1, wherein the PUF control circuit is configured to turn on the at least two pre-discharge transistors and the at least two access transistors, and to turn off the at least one enable transistor to disable the two cross-coupled inverters to write the first metastable logical state to each of the plurality of bit cells.

8. The PUF generator of claim 1, wherein the PUF control circuit is configured to turn on the at least one enable transistor, and turn off the at least two access transistors and the at least two pre-discharge transistors of each of the plurality of columns to allow the first metastable logical state to stabilize to the second logical state in each of the plurality of bit cells.

9. The PUF generator of claim 1, wherein the PUF control circuit is further configured to turn on the at least two access transistors to readout the second logical state from each of the plurality of bit cells to generate a PUF signature.

10. A method for generating a physical unclonable function (PUF) signature comprising:
equalizing at least two storage nodes with substantially the same voltages in each of a plurality of bit cells in a plurality of column and at least one row of a PUF cell array by turning on at least two pre-discharge transistors coupled to each of the plurality of column allowing each of the plurality of bit cells having a first metastable logical state, wherein each of the plurality of bit cells comprises at least one enable transistor, at least two access transistors, and at least two storage nodes, wherein the at least two storage nodes of each of the plurality of bit cells in each of the plurality of columns are coupled to the two pre-discharge transistors of the corresponding column through the corresponding at least two access transistors, wherein the at least two pre-discharge transistors are further coupled to a second voltage;
stabilizing the first metastable logical state in each of the plurality of bit cells to a second logical state by turning on the at least one enable transistor and turning off the at least two access transistors allowing each of the plurality of bit cells to determine a second logical state; and
generating a PUF signature by turning on the at least two access transistors to read out the second logical states of the plurality of bit cells.

11. The method of claim 10, wherein the equalizing further comprising:
turning on the at least two access transistors, and tuning off the at least one enable transistor.

12. The method of claim 10, wherein the at least two access transistors each is coupled between a bitline (BL) and one corresponding storage node.

13. The method of claim 10, wherein the at least two access transistors each comprise an n-type metal oxide semiconductor (NMOS) transistor and the at least one enable transistor comprises a p-type metal oxide semiconductor (PMOS) transistor.

14. The method of claim 10, wherein the at least one enable transistor is coupled between two cross-coupled inverters and a first voltage.

15. The method of claim 10, wherein the at least two pre-discharge transistors each is coupled between the BL and a second voltage.

16. The method of claim 10, wherein the plurality of bit cells each further comprises two cross-coupled inverters each comprising one n-type metal oxide semiconductor (NMOS) and one p-type metal oxide semiconductor (PMOS) transistors.

17. The method of claim 10, wherein the stabilizing and the generating further comprising:
turning off the at least two pre-discharge transistors.

18. A physical unclonable function (PUF) generator comprising: a PUF cell array comprising a plurality of bit cells configured in a plurality of columns and at least one row, wherein each of the plurality of columns is coupled to at least two pre-discharge transistors, and each of the plurality of bit cells comprises at least one enable transistor, at least two access transistors, at least two storage nodes, and two cross-coupled inverters, wherein the at least two storage nodes of each of the plurality of bit cells in each of the plurality of columns are coupled to the two pre-discharge transistors of the corresponding column through the corresponding at least two access transistors, wherein the at least two pre-discharge transistors are further coupled to a second voltage, wherein each of the two cross-coupled inverters comprises one n-type metal oxide semiconductor (NMOS) and one p-type metal oxide semiconductor (PMOS) transistors, and a PUF control circuit coupled to the PUF cell array, wherein the PUF control circuit is configured to access the plurality of bit cells to pre-charge the at least two storage nodes with substantially the same voltages allowing each of the plurality of bit cell having a first metastable logical state; to determine a second logical state; and based on the determined second logical states of the plurality of bit cells, to generate a PUF signature.

19. The PUF generator of claim 18, wherein the at least two pre-discharge transistors each is coupled between a bitline (BL) and a second voltage.

20. The PUF generator of claim 18, wherein the PUF control circuit is configured to turn on the at least two pre-discharge transistors and the at least two access transistors and to turn off the at least one enable transistor to disable the two cross-coupled inverters to write the first metastable logical state to each of the plurality of bit cells.

21. The PUF generator of claim 18, wherein the PUF control circuit is configured to turn on the at least one enable transistor and turn off the at least two access transistors and the at least two pre-discharge transistors of each of the plurality of columns to allow the first metastable logical state to stabilize to the second logical state in each of the plurality of bit cells.

22. The PUF generator of claim 18, wherein the PUF control circuit is further configured to turn on the at least two access transistors to readout the second logical state from each of the plurality of bit cells to generate a PUF signature.

* * * * *